May 20, 1952     C. R. WALTERS     2,597,210
CLOTHESLINE TIGHTENER
Filed July 1, 1949     2 SHEETS—SHEET 1
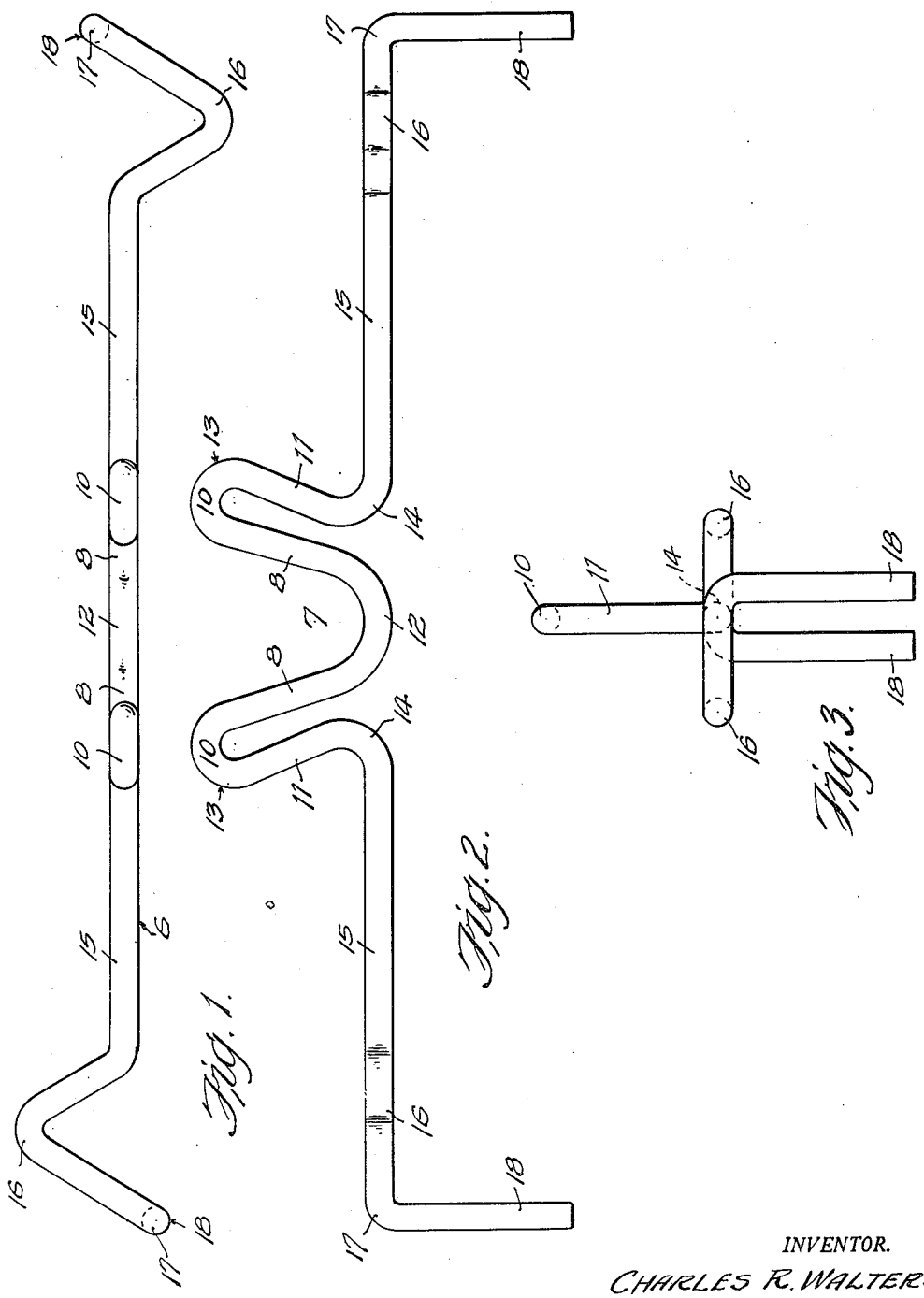
INVENTOR.
CHARLES R. WALTERS
BY
ATTORNEY.

May 20, 1952 C. R. WALTERS 2,597,210
CLOTHESLINE TIGHTENER
Filed July 1, 1949 2 SHEETS—SHEET 2

INVENTOR.
CHARLES R. WALTERS
BY
ATTORNEY.

UNITED STATES PATENT OFFICE 2,597,210

CLOTHESLINE TIGHTENER

Charles R. Walters, Normandy, Mo.

Application July 1, 1949, Serial No. 102,629

2 Claims. (Cl. 24—71.3)

My invention relates to a clothesline tightening device.

An important object of the invention is to provide a device which is simple and inexpensive in construction, inexpensive in manufacture and quick to operate for taking the slack out of a clothesline and to hold it taut between two supporting members, thus eliminating the use of clothesline props.

A further object of the invention resides in providing a foolproof clothesline tightener that is not only quick and easy for a woman to apply to a clothesline, but which is extremely safe to use and operate, since a clothesline in tension is a dangerous force and should a tightening device to be applied thereto slip, or become disengaged therefrom while applying the same, or removing it from a taut line.

A further object of the invention resides in the provision of a simple device which is self locking in every half turn thereof, whether the clothesline is being tightened, or whether the line is being slackened in removing the device therefrom, thus insuring safety against the device slipping off of the line and getting out of control of the operator.

A further object of the invention is to provide a clothesline tightener to overcome certain practical objections to, and defects in, line tighteners of the present known types.

A still further object of the invention resides in the provision of a clothesline tightener which is small in size, light in weight, and which can be carried in and out of a house with the clothespins and so fashioned that it can be easily and quickly cleaned.

Other objects and advantages of the invention will be apparent from the following specification.

In the accompanying drawings forming a part of this application, and in which like characters of reference are employed to designate like parts through the same;

Fig. 1 is a top plan view of the clothesline tightener embodying the features of the invention.

Fig. 2 is a side elevation of the device.

Fig. 3 is an end view of the device, looking at the left hand end thereof.

Figure 4:
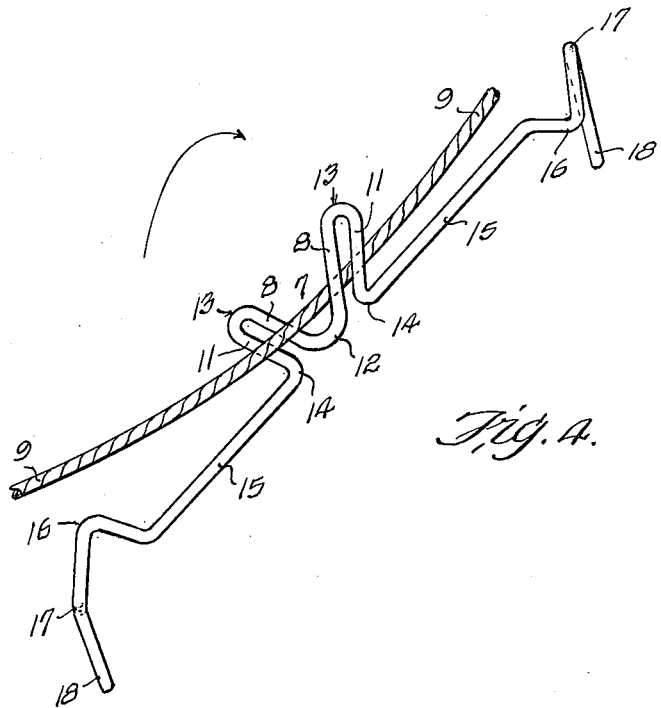
Fig. 4 is a view in perspective of the device, showing the same as being first applied to a slack clothesline.

In the drawings, wherein for the purpose of illustration, is shown a preferred embodiment of my invention, the numeral 6 designates, generally, a single length of suitable diameter metallic rod material of predetermined length to provide a body portion which is preferably circular in cross-section throughout its length.

The rod-like body is fashioned midway its ends to form a medial V-shaped space 7 formed by the upwardly diverging arms 8 to initially receive the clothesline 9 as the device is being applied thereto. The outer ends of the diverging arms 8 are folded back, as at 10 to form adjacently spaced arms 11 which converge in the direction of the base 12 of the V-shaped space 7 to provide two spaced upwardly diverging horn like body members designated, generally, as 13, around which the clothesline 9 is wound in taking the slack out of the line. The free ends of the arms 11 adjacent the base 12 of the V-shaped arms 8 are bent, as at 14 and project in opposite directions from said arms 11, but in a common plane with the arms 8 and 11 and at right angles to the line of symmetry of the V-shaped space 7, thus forming two crank arms 15, which at their extremities, a V-shaped offset is formed in a plane at right angles to the plane of the aforesaid arms 8 and 11 to provide offset shoulders 16 projecting in opposite directions to one another on each side of the plane of the diverging horns 13, thus completing the formation of each crank arm 15. The outer or free ends of the V-shaped offset shoulders 16 are bent, as at 17, at right angles to the crank arms 15 and continue to provide relatively short operating handle portions 18 formed parallel to the line of symmetry in opposite directions from the horns 13 and in a plane on either side of the plane of the arms 8 and 11 of the diverging rope winding horns 13. The handles 18 also serve as rope, or line engaging members.

To operate the line tightening device, the operator grasps one or both of the handle portions 18 and places the device under the line 9 so that the line will be received in the V-shaped space 7 thereof. The operator then cranks, or turns the device by the handle portion counterclockwise, causing the line 9 to be wound around the diverging horns 13 until the line is taut. The V-shaped offset shoulders 16 adjacent the operating handles 18 are adapted to come to rest upon the taut line, as clearly shown in Fig. 5 for locking the device on the clothesline 9. When either V-shaped offset shoulder 16 is resting on the line 9, the device cannot slip on the line or become disengaged therefrom, except by manually removing the shoulder 16 from engagement with the line 9.

Figure 5:
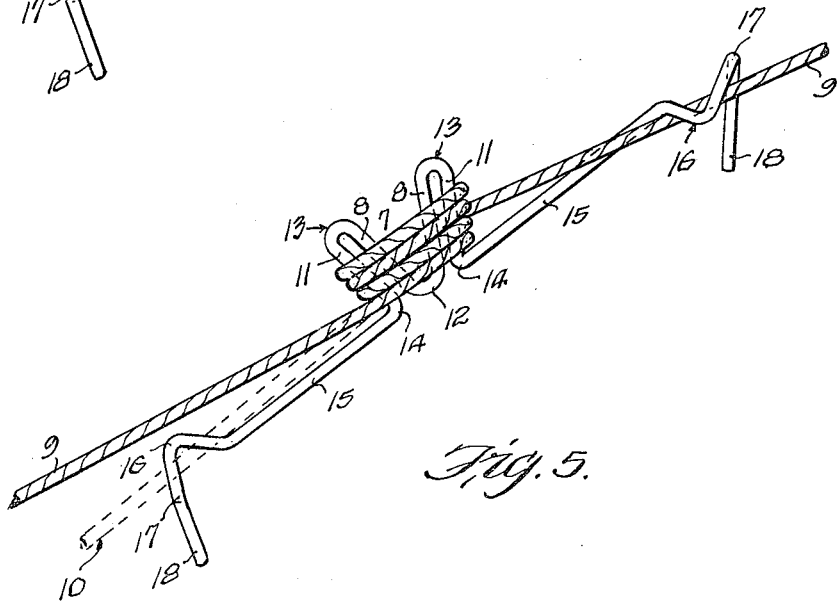
Fig. 5 is a view in perspective of the device, showing the same as having taken the slack out of the clothesline and locked at one end thereof to the line to prevent slipping thereof on the line, or disengagement therefrom without manual assistance.

If double safety protection is desired, the diagonally opposite offset shoulder 16 at the other end of the device may also be brought to rest upon the line 9, as shown by the dotted lines 19, as indicated in Fig. 5 of the drawings.

The many advantages of the herein described invention will readily suggest themselves to those skilled in the art to which it appertains, and, it will be clearly apparent that the device can be used effectively even when heavy loads of wash are hanging on the line and holding the line taut without the use of clothesline props. It is also found useful for builders' chalk lines, holding them taut. Also, it may be successfully used to shorten ropes in a fashion much more simple than the rope stays provided with tents. It may also be successfully used in connection with light wire.

It is to be understood that the form of my invention herein shown and described, is to be taken as a preferred example of the same, and that various minor changes in the shape, size and arrangement of the integral portions may be resorted to, without departing from the spirit of the invention, or the scope of the appended claims.

What I claim is:

1. In a line tightening device of the class described comprising a body formed from a single length of metallic rod material consisting of a V-shaped member including spaced looped upwardly diverging line engaging horns open at their lower ends and terminating at their lower outer ends in crank arms projecting in opposite directions, the extremities of the crank arms having horizontally disposed V-shaped offset portions projecting in opposite directions providing shoulders in a plane with the crank arms, and the offset portions terminating in straight depending operating handles.

2. In a device for taking the slack out of rope or the like stretched between two points of support, a pair of crank arms arranged in axial alignment, the inner ends of said arms terminating in upwardly diverging arms which in turn are folded back in looped fashion to provide a V-shaped gap between the first mentioned arms and providing thereby diverging horns around which a portion of the rope may be wound, the outer ends of the said crank arms terminating in horizontally disposed offset portions arranged to project in opposite directions to provide rope engaging shoulders, and straight operating handles depending from the ends of the offset rope engaging shoulders, which handles also serve as rope engaging members.

CHARLES R. WALTERS.

REFERENCES CITED

The following references are of record in the file of this patent:

UNITED STATES PATENTS

| Number | Name | Date |
| --- | --- | --- |
| 78,487 | Seyler | June 2, 1868 |
| 563,137 | Conway | June 30, 1896 |
| 1,191,598 | Hofstrand | July 18, 1916 |
| 1,467,420 | Breer | Sept. 11, 1923 |